(12) United States Patent
Tsubaki

(10) Patent No.: US 9,124,807 B2
(45) Date of Patent: Sep. 1, 2015

(54) IMAGING APPARATUS, CONTROL METHOD THEREFOR, AND STORAGE MEDIUM

(71) Applicant: CANON KABUSHIKI KAISHA, Tokyo (JP)

(72) Inventor: Hidetoshi Tsubaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 14/170,440

(22) Filed: Jan. 31, 2014

(65) Prior Publication Data

US 2014/0218569 A1     Aug. 7, 2014

(30) Foreign Application Priority Data

Feb. 1, 2013   (JP) .................................. 2013-018680

(51) Int. Cl.
*H04N 5/232*     (2006.01)
*H04N 5/353*     (2011.01)

(52) U.S. Cl.
CPC ......... *H04N 5/2329* (2013.01); *H04N 5/23274* (2013.01); *H04N 5/23258* (2013.01); *H04N 5/3532* (2013.01)

(58) Field of Classification Search
CPC .......................... H04N 5/2329; H04N 5/23274
USPC ......................................... 348/296, 297, 241
See application file for complete search history.

(56) References Cited

U.S. PATENT DOCUMENTS

| | | | |
|---|---|---|---|
| 2004/0218062 A1* | 11/2004 | Silverstein et al. | 348/222.1 |
| 2007/0120997 A1* | 5/2007 | Sasaki et al. | 348/362 |
| 2010/0141735 A1* | 6/2010 | Yamashita et al. | 348/36 |
| 2011/0211082 A1* | 9/2011 | Forssen et al. | 348/208.2 |
| 2012/0033098 A1* | 2/2012 | Matsuyama | 348/222.1 |
| 2012/0287295 A1* | 11/2012 | Oota | 348/208.99 |
| 2013/0044241 A1* | 2/2013 | Zhou | 348/241 |
| 2014/0078327 A1* | 3/2014 | Miyasako | 348/208.6 |

FOREIGN PATENT DOCUMENTS

| | | |
|---|---|---|
| JP | P2005-26941 A | 1/2005 |
| JP | P2006-186481 A | 7/2006 |

OTHER PUBLICATIONS

Baker, Simon, Bennett, Eric, Kang, Sing Bing, and Szeliski, Richard. "Removing Rolling Shutter Wobble." Computer Vision and Pattern Recognition: Proceedings of the 2010 IEEE Conference on Computer Vision and Pattern Recognition (CVPR), San Francisco, CA, Jun. 13-18, 2010. 2392-2399.

* cited by examiner

*Primary Examiner* — Tuan Ho
*Assistant Examiner* — Marly Camargo
(74) *Attorney, Agent, or Firm* — Canon USA, Inc., IP Division

(57) ABSTRACT

There is provided an imaging apparatus capable of reducing a margin region required for rolling shutter distortion correction processing. The imaging apparatus includes an imaging unit employing a rolling shutter method, and a correction unit configured to perform correction processing for reducing a rolling shutter distortion on image data captured by the imaging unit. The correction unit adjusts readout positions of other lines relative to a readout position of a reference line in the image data, and sets the reference line so as to reduce a deviation amount between the readout position of the reference line and the readout positions of the other lines.

10 Claims, 14 Drawing Sheets

IMAGING APPARATUS, CONTROL METHOD THEREFOR, AND STORAGE MEDIUM

BACKGROUND

1. Field

The present subject matter relates to a technique for performing correction processing for a distortion generated due to a rolling shutter method on captured image data.

2. Description of the Related Art

Sizes and weights of imaging apparatuses such as video cameras and digital cameras have been reducing more and more, resulting in an increase in opportunities to capture image data by portable imaging apparatuses. In recent years, Complementary Metal Oxide Semiconductor (CMOS) sensors have been used for image sensors of such imaging apparatuses. This is mainly because the CMOS sensors have such advantages that they can easily realize a cost reduction and an increase in the number of pixels, and their power consumption is low.

However, use of the CMOS sensors as the image sensors may lead to generation of a distortion due to a camera shake or a motion of an object (or a shake of an object), in addition to a vibration of captured image data. This is a phenomenon that does not occur when Charge Coupled Devices (CCDs) are used as the image sensors.

Most of the CMOS sensors are configured to read out image data by a rolling shutter method, in which image data is sequentially read out pixel by pixel or line by line (normally, in a horizontal direction, or a vertical direction in some cases). According to this rolling shutter method, each pixel or each line is exposed for a different exposure time period. However, sequentially reading out image data pixel by pixel generates only a negligibly small time difference among exposure starts of pixels in one line, compared to a time difference among exposure starts of lines. Therefore, in the following description, reading out image data pixel by pixel will be treated as if it has a same problem as reading out image data line by line.

When image data is captured by a sensor of the rolling shutter type, if an object moves or a camera shakes during exposure periods from a top line to a bottom line in a screen, the image of the object is deformed due to a time difference in the exposure period of each scanned line, and this appears as a distortion. Hereinafter, this distortion will be referred to as a rolling shutter distortion.

One possible solution therefor is providing a global shutter function, which is a standard function for the CCDs. Another possible solution is providing a plurality of circuits for reading out pixel data so as to use them in parallel or assign each of them to each region in image data, thereby speeding up the readout operation to reduce a time difference among the exposure periods.

However, the former solution requires transistors of several times as many as pixels, thereby leading to a cost increase. Further, this proposal has a problem of negatively affecting an image quality itself because this prevents an increase in aperture ratios of the pixels. Therefore, adoption of this solution is limited to some imaging apparatuses designed for measurement. On the other hand, the latter solution also leads to a cost increase for providing a large number of readout circuits enough to reduce a time difference among the exposure periods, because the number of pixels in image data is ever increasing.

Therefore, a correction relying on image processing predominates as a method for correcting a rolling shutter distortion. Various methods are proposed as rolling shutter distortion correction processing. For example, many of them are configured to realize the rolling shutter distortion correction processing by geometrically deforming image data, as discussed in Japanese Laid-Open Patent Application No. 2006-186481.

On the other hand, the imaging apparatus includes a sensor that detects a camerawork regarding a rotation and a shift of the imaging apparatus such as a gyroscope and an acceleration sensor. In an image analysis, a camerawork (a self-motion), a global motion, and a motion of an object are calculated or estimated using an analysis technique among a plurality of continuous image data pieces. "Removing Rolling Shutter Wobble" written by Simon Baker et al. presented in CVPR 2010 discusses a method for acquiring motion information by fitting processing between polynomial interpolation of a motion and image data.

A simple correction method is a method for performing the rolling shutter distortion correction processing while focusing on only a translation motion of image data in the horizontal direction and the vertical direction. On the other hand, a complicated correction method is a method for taking all types of cameraworks and depth positions of an object into consideration according to an existing principle such as Structure From Motion (SFM). A further complicated correction method is a method for performing the rolling shutter distortion correction processing while discriminating a motion of an object to estimate or calculate motion information. In this manner, the rolling shutter distortion correction processing makes a correction that can reduce a rolling shutter distortion by considering a time difference in an exposure period of each line, calculating a geometric deformation that can cancel out it, and applying this geometric deformation to image data.

Regarding a temporal direction, there are also simple methods directed to only a distortion (generally categorized as a shear) generated by a motion that can be considered to have a constant direction and size as a motion during an exposure period in one frame. On the other hand, there are also methods directed to a distortion (categorized as a wobble or a jello effect) generated by a motion having a direction and a size that are not constant but variable during a frame period.

Further, for actually implementing the rolling shutter distortion correction processing, there are various kinds of possible methods such as a real-time method in which the rolling shutter distortion correction processing is performed at the time of imaging, an off-line method in which the rolling shutter distortion correction processing is performed at the time of reproduction or on recorded image data, and a method in which the rolling shutter distortion correction processing is performed in another image processing apparatus than the imaging apparatus.

Any of the above-described methods perform the rolling shutter distortion correction processing by setting a single line as a reference line among lines having different exposure periods, and geometrically deforming image data to eliminate a rolling shutter distortion caused by a motion generated during a different exposure period as if the lines are imaged during the same exposure period as the reference line, which is in common among all of these methods.

This rolling shutter distortion correction processing requires a determination of a certain row as a reference row, and calculation of how much other rows deviate from this reference row. Known configurations include selecting a first row as the reference row in consideration of real-time processing, and selecting a central row in image data as the reference row to reduce a deformation amount of the whole image data. In either case, the reference row is fixed.

Further, the geometric deformation for canceling out a motion also requires imaging with a larger size than output image data by adding a margin region to the size of the output image data, so as not to generate a region having no pixel data regardless of which correction method is employed.

Regarding this margin region, if an electronic camera shake correction is performed at the same time, a margin region for this electronic camera shake correction should be also taken into consideration. The electronic camera shake correction is a correction of shifting a position where image data is read out according to a degree of a camera shake from the image data captured while a margin region is added thereto. The camera shake correction is realized by changing a position where the image data is read out from a sensor, cutting out output image data from a buffer storing the image data, or geometrically deforming the image data stored in the buffer.

However, according to the above-described conventional rolling shutter distortion correction processing, as a rolling shutter distortion is larger, a larger margin region is necessary to correct the rolling shutter distortion. On the other hand, a request for an increase in the number of pixels in image data from users leads to a tendency to reduce the number of sensor pixels assignable to the margin region for the rolling shutter distortion correction processing. This tendency is further remarkable in the methods that also perform the electronic shake correction at the same time, under the influence of a trend of making a vibration-proof function more dynamic.

Therefore, one object for the rolling shutter distortion correction processing is to realize saving of the margin region required for the rolling shutter distortion correction processing while enabling a correction of even a rolling shutter distortion generated by a larger shake at the same time. Especially, if the rolling shutter distortion correction processing is performed in addition to the electronic vibration correction mechanism, the margin region should be shared therebetween.

Therefore, it is desirable to reduce the margin region required during the rolling shutter distortion correction processing.

SUMMARY

According to an aspect of the present subject matter, an imaging apparatus includes an imaging unit employing a rolling shutter method, and a correction unit configured to perform correction processing for reducing a rolling shutter distortion on image data captured by the imaging unit. The correction unit adjusts readout positions of other lines relative to a readout position of a reference line in the image data, and sets the reference line so as to reduce a deviation amount between the readout position of the reference line and the readout positions of the other lines.

Further features of the present subject matter will become apparent from the following description of exemplary embodiments with reference to the attached drawings.

DETAILED DESCRIPTION

Various exemplary embodiments, features, and aspects of the subject matter will be described in detail below with reference to the drawings.

Figure 1:
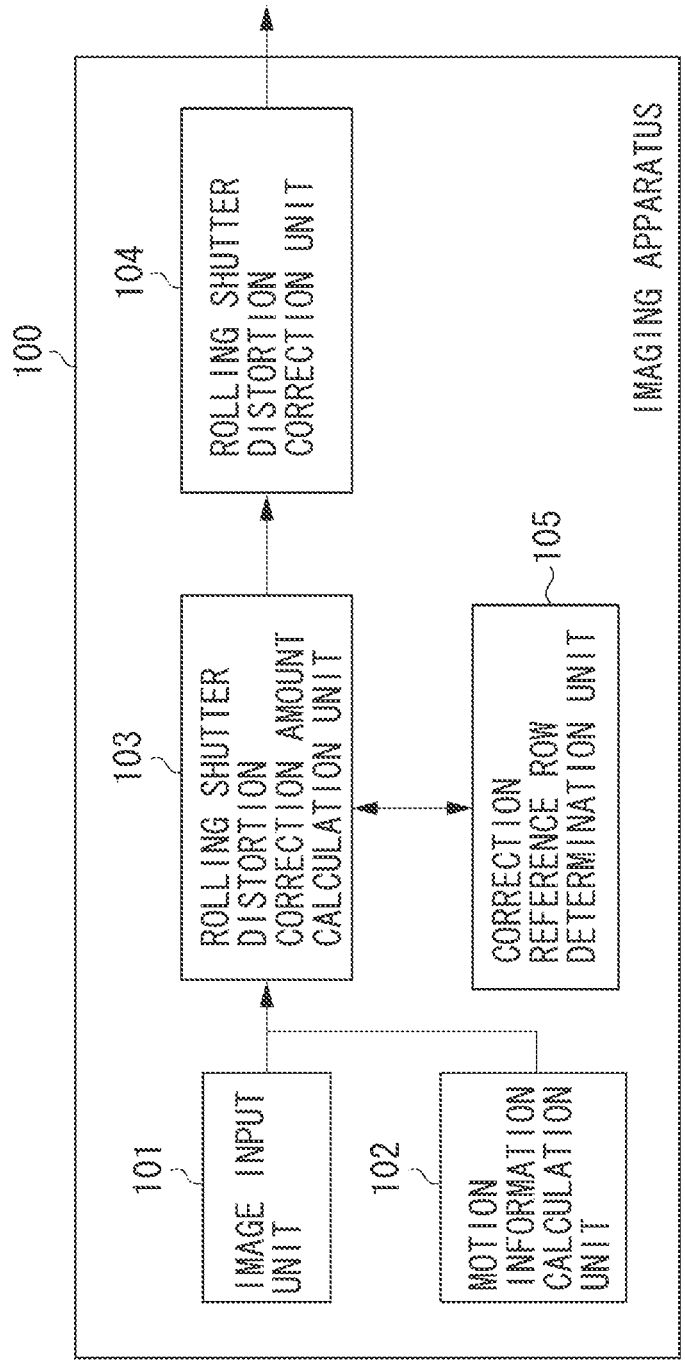
FIG. 1 is a block diagram illustrating a configuration of an imaging apparatus according to a first exemplary embodiment of the present subject matter.

First, a first exemplary embodiment of the present subject matter will be described. FIG. 1 illustrates a configuration of an imaging apparatus 100 according to the present exemplary embodiment. As illustrated in FIG. 1, the imaging apparatus 100 includes an image input unit 101, a motion information calculation unit 102, a rolling shutter distortion correction amount calculation unit 103, a rolling shutter distortion correction unit 104, and a correction reference row determination unit 105.

The image input unit 101 inputs image data formed by imaging an object (hereinafter may be referred to as captured image data in some cases). More specifically, the image input unit 101 includes a not-illustrated optical system, image sensor, and image processing circuit. First, an optical image of an object is formed on the image sensor by the optical system, and is converted into an electric signal by a photoelectric conversion operation of the image sensor. Next, the object image converted into the electric signal is converted from analog data into digital data by the image processing circuit, and is subjected to Bayer interpolation processing if the image sensor is a single plate sensor. Then, the object image is subjected to signal processing of an imaging system including an aperture correction, a gamma correction, white balance processing, and the like, by which captured image data is generated. Actually, this image processing circuit for performing the processing is configured as a single circuit or a plurality of partial circuits. Especially, the image processing circuit of the imaging system is actually often configured to be divided into two parts, i.e., an analog front end, which handles analog electric signals, and a digital back end after the analog-digital (AD) conversion.

Figure 2:
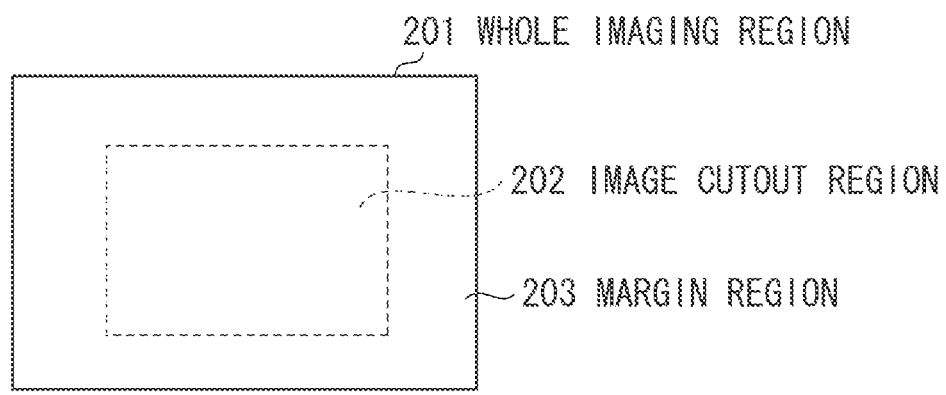
FIG. 2 illustrates a relationship among an image cutout region corresponding to a size of output image data, a margin region, and a whole region (a whole imaging region) of captured image data.

FIG. 2 illustrates a relationship among an image cutout region 202, which corresponds to a size of output image data, a margin region 203, and a whole region (a whole imaging region) 201 of captured image data. As illustrated in FIG. 2, the whole region (the whole imaging region) 201 of the captured image data input from the image input unit 101 corresponds to a size acquired by adding the margin region 203 for rolling shutter distortion correction processing to the image cutout region 202, which corresponds to the size of the output image data.

The motion information calculation unit 102 detects a motion of the imaging apparatus 100. The motion information calculation unit 102 outputs motion information of the imaging apparatus 100, or information generated by converting the motion information of the imaging apparatus 100 into a motion in image data. The motion information calculation unit 102 is realized by a sensor that is mounted on the imaging apparatus 100 and calculates a rotation and a shift amount, such as a gyroscope, an acceleration sensor, or a magnetic sensor. The motion information calculation unit 102 acquires the motion information with a shorter sampling interval than a sampling interval corresponding to a frame rate or a sampling rate of each row in the image data. The motion information can be expressed by the following formula 1 as a motion vector with respect to an arbitrary time together with a camera parameter like focal length information.

$$\vec{p}(t) = (p_1(t), p_2(t), \quad \text{FORMULA 1}$$

Each element in the motion information expressed by the formula 1 corresponds to a value of an output signal of the sensor at a certain moment, a value acquired by multiplying the output signal by a coefficient, a value including a variable camera parameter like a focal length that varies by zooming, or the like.

If the motion information corresponding to a camerawork is handled after it is converted into a motion in the image data, the motion information is converted into a motion in the image data by using a spatial motion model function expressed by the following formula 2.

$$\Delta \vec{x} = \frac{d\vec{x}(t)}{dt} = m(\vec{x}; \vec{p}(t)) \quad \text{FORMULA 2}$$

The symbol "$\vec{p}(t)$" represents a parameter vector including a camera parameter like a pixel size and a focal length in addition to the motion information of the imaging apparatus 100.

The symbol "m( )" represents the spatial motion model function for changing various kinds of motion information of the imaging apparatus 100 to a motion in the image data. The symbol "$\vec{x}$" represents coordinates in the image data. The symbol "$\Delta\vec{x}$" represents a motion vector generated on the coordinates $\vec{x}$ in the image data per unit time.

The present exemplary embodiment is described assuming that the imaging apparatus 100 is equipped with a rotation sensor that uses two axes perpendicular to an optical axis as a rotational axis, such as a gyroscope, as the motion information calculation unit 102. Therefore, if the spatial motion model function is a linear approximation model near the optical axis for a rotation, the motion information can be expressed by the following formula 3.

$$\Delta \vec{x}(t) = m(\vec{x}; \vec{p}(t)) = \left( \frac{f(t)\Delta\theta_1(t)}{d_x}, \frac{f(t)\Delta\theta_2(t)}{d_y} \right) \quad \text{FORMULA 3}$$

In this formula, $\Delta\theta_1(t)=p_1(t)$, and $\Delta\theta_2(t)=p_2(t)$. (Further in this formula, $\vec{p}(t)=(p_1(t), p_2(t), p_3(t), p_4(t), p_5(t))=(\Delta\theta_1(t), \Delta\theta_2(t), f(t), d_x, d_y)$.)

Obviously, the spatial motion model function described above can be replaced with an arbitrary function. This function can be replaced with a further advanced model by, for example, increasing the number of variables in the motion information of the imaging apparatus 100, which are inputs, i.e., increasing the number of sensors, or replacing the model with a more accurate model without using approximation.

The rolling shutter distortion correction amount calculation unit 103 calculates a geometric deformation amount required for the rolling shutter distortion correction processing based on the motion information calculated by the motion information calculation unit 102. In other words, the rolling shutter distortion correction amount calculation unit 103 calculates a geometric deformation amount as a rolling shutter distortion correction amount for geometrically correcting a geometric distortion in the captured image data that is generated by the motion of the imaging apparatus 100 during a time difference in an exposure period of each row, which is caused by the rolling shutter, based on an inverse transform.

Figure 3A:
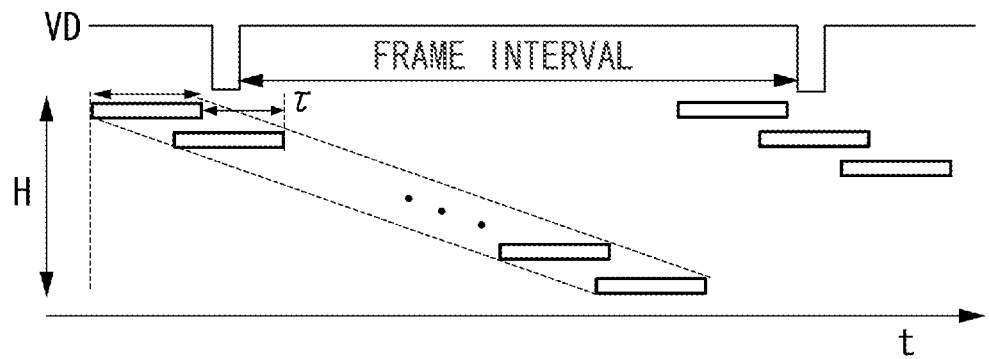
FIG. 3A illustrates a relationship between a frame interval of image data captured by the imaging apparatus 100 that employs the rolling shutter method, and an exposure period of each row.

FIG. 3A illustrates a relationship between a frame interval of the image data captured by the imaging apparatus 100 employing the rolling shutter method, and an exposure period of each row. As illustrated in FIG. 3A, in the imaging apparatus 100 employing the rolling shutter method, each frame starts to be read out in synchronization with a vertical synchronization signal, and each row in each frame is sequentially exposed and read out. Further, as illustrated in FIG. 3A, assuming that τ represents a readout delay time between rows, and H represents the number of all rows in the image data, a readout time difference of (H−1)τ is generated between the first row and the last row.

The rolling shutter distortion correction amount for each of pixels constituting the image data is calculated as a geometric deformation amount to eliminate a distortion generated by a motion according to the different exposure period based on a single row among rows having difference exposure periods, as if they are imaged during a same exposure period.

Figure 3B:
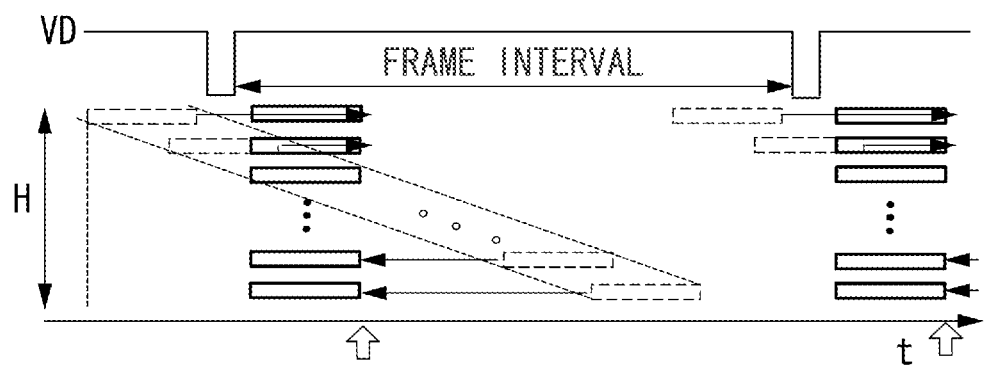
FIG. 3B illustrates a relationship between the frame interval and the exposure period of each row when the image data illustrated in FIG. 3A is corrected.

FIG. 3B illustrates a relationship between the frame interval and the exposure period of each row when the image data illustrated in FIG. 3A is corrected like image data captured by a global shutter with use of the rolling shutter distortion correction amount calculation unit 103 and the rolling shutter distortion correction unit 104. The example illustrated in FIG. 3B indicates the image data corrected using the third row from the first row as the reference row. The present exemplary embodiment corrects the image data to eliminate a geometric change generated during a time difference in an exposure timing from the reference row for each row. As a result, the present exemplary embodiment can acquire a same effect as shifting the exposure period in the temporal direction. Therefore, the present exemplary embodiment can acquire image data as if the reference row and the other rows are exposed at a same timing, as illustrated in FIG. 3B. According to the present exemplary embodiment, the correction reference row determination unit 105 dynamically changes the reference row, instead of fixing the reference row to a specific row.

Basically, backward mapping is used in the rolling shutter distortion correction processing. Therefore, a value acquired by converting coordinates in the image data after the rolling shutter distortion correction processing into coordinates in the image data before the rolling shutter distortion correction processing is calculated as the correction amount. A basic formula of the mapping for acquiring the coordinates in the image data before the rolling shutter distortion correction processing is expressed by the following formula 4.

$$\vec{x}' = \vec{x} + \int_{t_1}^{t} m(\vec{x}; \vec{p}(s)) ds, \text{ in which } t = y'\tau \approx y\tau, t_1 = y_1\tau \quad \text{FORMULA 4}$$

The symbol "$\vec{x}'$" represents the coordinates in the image data before the rolling shutter distortion correction processing. The symbol "$\vec{x}$" represents the coordinates in the image data after the rolling shutter distortion correction processing. The symbol "m( )" represents the spatial motion model function. The second term on the right side is a term for reproducing a motion in the image data from a motion of the imaging apparatus 100 generated during a difference $(y-y_1)\tau$ between exposure periods of a reference row $y_1$ and a row $y$ that contains a target pixel of the geometric deformation.

The symbol "$t_1$" represents a time when the reference row is imaged.

Further, if the formula can be simplified, the function m( ) may be placed outside the integral as expressed by the following formula 4'.

$$\vec{x}' = \vec{x} + m(\vec{x}; \int_{t_1}^{t} \vec{p}(s) ds) \quad \text{FORMULA 4'}$$

Further, a homography, which is a simple version of a mapping formula, is expressed in the form of a matrix constituted by three rows and three columns. The mapping formula expressed by the formula 4 can be linearly converted by increasing the dimension. As a result, if this mapping can be expressed by a homography expression expressed by the following formula 5, this mapping can be handled as a parameter of a homography expression expressed by "h", which allows the geometric deformation to be expressed with a small amount of information.

$$h = \begin{bmatrix} h_1 & h_2 & h_3 \\ h_4 & h_5 & h_6 \\ h_7 & h_8 & h_9 \end{bmatrix} \quad \text{FORMULA 5}$$

In this formula, $$\begin{bmatrix} x'' \\ y'' \\ m \end{bmatrix} = h \begin{bmatrix} x \\ y \\ 1 \end{bmatrix}, x' = \frac{x''}{m}, y' = \frac{y''}{m}.$$

Figure 4A:
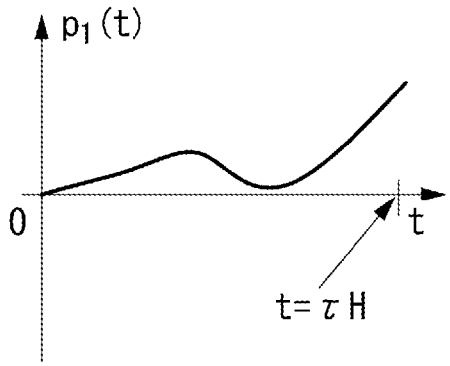
FIG. 4A illustrates motion information acquired from a yaw-direction rotation sensor, which is a motion information calculation unit 102.

FIG. 4A illustrates the motion information acquired from the yaw-direction rotation sensor, which is the motion information calculation unit 102. This is motion information acquired with use of a specific example of a certain motion model. In this disclosure, a rotation in a pitch direction is not illustrated, assuming that there is not such a rotation. Further, the mapping formula can be expressed by the following formula 6, if the formula is simplified by assuming that the focal length is fixed.

$$\vec{x}' = \vec{x} + \left( \frac{f \int_{t_1}^{t} p_1(s) ds}{d_x}, \frac{f \int_{t_1}^{t} p_2(s) ds}{d_y} \right), \quad \text{FORMULA 6}$$

in which $t = y'\tau \approx y\tau, t_1 = y_1\tau$

Further, the integral terms in the formula 6 are based on an assumption that an arbitrary angular variation amount regarding a rotation of the imaging apparatus 100, which is generated during the time difference in the exposure period, can be acquired, as expressed by the following formula 7.

$$\int_{t_1}^{t} p_1(s) ds = \theta_1, \int_{t_1}^{t} p_2(s) ds = \theta_2 \quad \text{FORMULA 7}$$

Figure 4B:
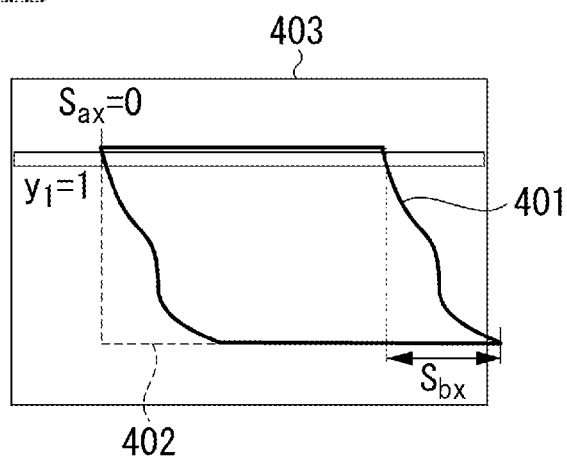
FIG. 4B illustrates rolling shutter distortion correction processing when a first row is used as a reference row.

FIG. 4B illustrates how the rolling shutter distortion correction processing is performed when the first row is used as the reference row ($y_1=1$, $t_1=1$). Further, FIG. 4C illustrates how the rolling shutter distortion correction processing is performed when the central row in the readout direction (the vertical direction in FIG. 4C) is used as the reference row ($y_1=H/2$, $t_1=H\tau$).

Figure 4C:
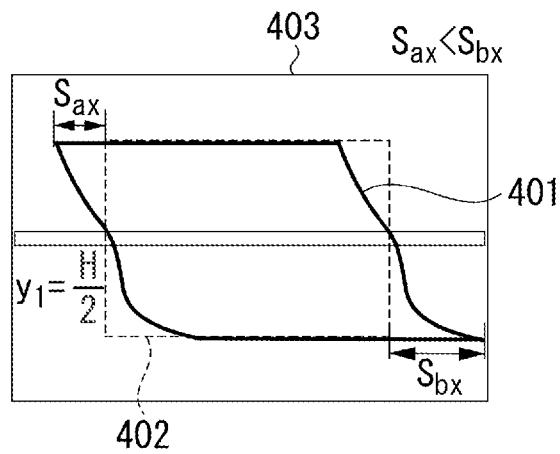
FIG. 4C illustrates the rolling shutter distortion correction processing when a central row in a readout direction is used as the reference row.

In FIGS. 4B and 4C, a region 401 surrounded by a solid curve is a region corresponding to pixels required to generate the output image data. Further, a region 402 surrounded by a broken line is an image cutout region where pixel values are sampled. A periphery region 403 surrounded by a solid rectangle is a whole image region acquired by adding a margin region prepared to acquire the pixel values in the region 401 surrounded by the solid curve to the image cutout region 402. In FIGS. 4B and 4C, a rectangle inscribed in the region 401 required to generate the output image data is located beyond the image cutout region 402 to the left by a size $S_{ax}$. In FIGS. 4B and 4C, the rectangle inscribed in the region 401 required to generate the output image data is located beyond the image cutout region 402 to the right by a size $S_{bx}$. central row M in the whole image region 403 is expressed by the following formula 8. In the formula 8, "H" represents an image height of the image cutout region 402, which is expressed by the number of pixels.

$$M = H/2 \quad \text{FORMULA 8}$$

As understood from a difference between FIGS. 4B and 4C, the margin region varies according to how the reference row is determined even if the imaging apparatus 100 has a same motion when capturing image data. As illustrated in FIG. 4B, using the first row as the reference row is suitable for real-time processing, because this allows a mapping destination of a row to be sequentially calculated one after another upon acquisition of motion information of the first row. However, if the imaging apparatus 100 has motion information as illustrated in FIG. 4A, the margin region is unevenly set, because only the right side of the margin region is used for sampling as illustrated in FIG. 4B to allow the pixel values to be constantly sampled without losing image data. Therefore, this method quickly reaches a limit of the margin region. As a result, use of the margin region tends to be significantly wasteful for a large rolling shutter distortion generated by a fast motion of the imaging apparatus 100, leading to a strict limitation imposed on a size of a correctable distortion and an increase in the required margin region.

On the other hand, as illustrated in FIG. 4C, using the central row in the readout direction as the reference row allows a range where the pixel values are sampled to be distributed to the left and right sides of the margin region. Using the central row in the readout direction as the reference row allows the margin region to be more efficiently utilized than using the first row as the reference row. Especially, when the imaging apparatus 100 is moving at a constant speed, the margin region is evenly distributed to the left side and the right side, realizing an ideal usage of the margin region. However, for a rolling shutter distortion generated by a motion of an inconstant speed, for example, for a motion accelerating later as illustrated in FIG. 4A, the size of the required margin size is left-right asymmetric, as expressed by the following formula 9.

$$s_{ax} < s_{bx} \quad \text{FORMULA 9}$$

In consideration of even a motion for which the required margin region is asymmetric, a large margin region should be prepared in preparation for asymmetry so that all kinds of motions can be dealt with.

The rolling shutter distortion correction unit 104 corrects a rolling shutter distortion by the geometric deformation. In other words, the rolling shutter distortion correction unit 104 receives inputs of the image data, and the parameter or the nomography of the mapping formula for the geometric deformation, and outputs image data in which the rolling shutter distortion is corrected by the geometric deformation. Further, simple alternative processing to the geometric deformation includes changing a position where the image data is read out from a buffer temporarily storing the image data including the margin region, and changing a position where the image data is read out from the image sensor, as derivatives therefrom. The image data output from the rolling shutter distortion correction unit 104 is recorded in a not-illustrated recording medium or displayed on a not-illustrated display unit.

The correction reference row determination unit 105 determines the reference row, based on which the rolling shutter distortion correction processing is performed. At this time, the correction reference row determination unit 105 selects the reference row that can minimize the margin region required for the rolling shutter distortion correction processing. The following formula 10 is an example of a function for determining the reference row.

$$y_{1best} = \underset{y_1}{\operatorname{argmin}} \left( f_{cost}(y_1, \vec{x}_{test}, \vec{p}) \right) \quad \text{FORMULA 10}$$

$$\left( \text{in which, if } (\forall \vec{x}_{test}) f_{cost} = 0, y_1 = \frac{H}{2} \right)$$

The symbol $$\text{``} \underset{y_1}{\operatorname{argmin}} () \text{''}$$

indicates selecting the reference row $y_1$ with which a function value inside the parentheses is minimized as a variable.

The symbol "$f_{cost}$" represents a cost function using $y_1$ as a variable, and is a function that yields a larger value when a large margin amount is required.

The symbol "$\vec{x}_{test}$" represents a sampling point in the image cutout region that is selected for the purpose of calculating the cost function $f_{cost}$.

The symbol "$\vec{p}$" represents a motion parameter including information of a corresponding time.

The symbol "$\forall \vec{x}_{test}$" indicates all test coordinates $\vec{x}_{test}$. The formula 10 is based on such an assumption that sampling targets of all test coordinates $\vec{x}_{test}$ are contained in the cutout image region, if $f_{cost}=0$.

All pixels in the image cutout region may be used as the sampling points in the image date, but the reference row can be efficiently selected by selecting pixel coordinates at four corners, or eight pixels in the periphery, in consideration of speeding up the processing. The determination of the reference row is realized by calculating an answer of the above-described formula using gradient descent optimization with the reference row set as the variable.

Figure 5A:
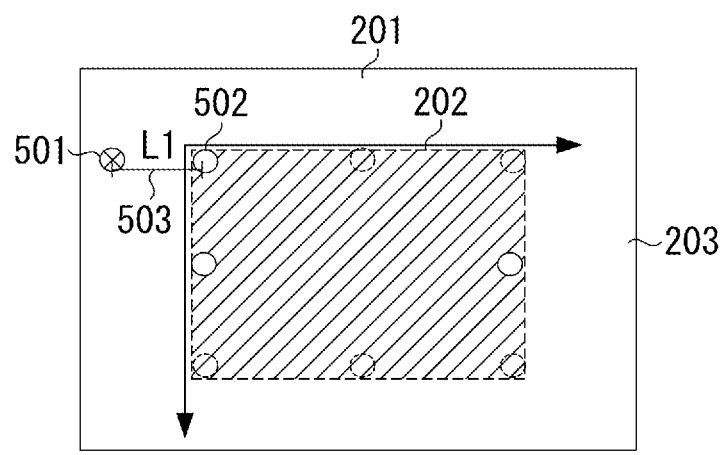
FIG. 5A illustrates an example of a sampling target, which is a mapping position.
Figure 5B:
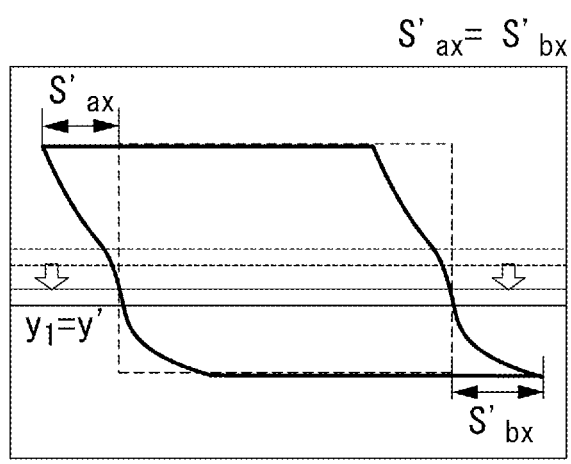
FIG. 5B illustrates an effect from a selection of the reference row.

The cost function $f_{cost}$ will be described with reference to FIGS. 5A and 5B. The cost function $f_{cost}$ is expressed by, for example, the following formula 11.

$$f_{cost} = \max\left( \frac{L1\left( \left| x' - \frac{W}{2} \right| - \frac{W}{2}, \left| y' - \frac{H}{2} \right| - \frac{H}{2} \right)}{\overline{\operatorname{rect}\left( \left( x'_{test} - \frac{W}{2} \right)/W, \left( y'_{test} - \frac{H}{2} \right)/H, \right)}} \right) \quad \text{FORMULA 11}$$

The symbol "$\vec{x}'=(x',y')$" represents coordinates acquired by mapping a sampling point in the image data after the rolling shutter distortion correction processing to the image data before the rolling shutter distortion correction processing.

The cost function $f_{cost}$ is a function for quantifying how much a sampling target most offset from the image cutout region, among sampling targets corresponding to positions where the sampling points are mapped, is located beyond the image cutout region. In the example illustrated in FIG. 5A, eight pixels in the periphery of the image cutout region 202 are indicated as white circles, and a sampling target 501 most offset from the image cutout region 202 is indicated as a white circle with an X written therein. Further, in the example illustrated in FIG. 5A, an upper left point 502 is selected as sampling source coordinates among the above-described eight pixels in the periphery. A distance indicated by a gauge 503 is a distance from the periphery of the image cutout region 202 to the pixel of the sampling target, and corresponds to the distance function L1 in the first term. The distance function L1 is a function for calculating a distance at coordinates in the image data. An arbitrary distance function such as an L2 function may be used as the distance function. The function expressed as rect in the second term is a function expressed by the following formula 12 similar to a so-called rectangular function.

$$\operatorname{rect}(x) = \begin{cases} 0 & x > \left| \frac{1}{2} \right| \\ 1 & x \leq \left| \frac{1}{2} \right| \end{cases} \quad \text{FORMULA 12}$$

Further, in the formula 11, since the rect is under a bar that indicates negation, this term returns 0 if the sampling target is within the image cutout region 202, and 1 if the sampling target is beyond the image cutout region 202 and is contained in the margin region 203. The correction reference row determination unit 705 selects a reference row that can minimize the margin region 203 required to generate the output image data by using the cost function $f_{cost}$, which expresses such a motion. However, the correction reference row determination unit 705 does not necessarily have to select a reference row that can minimize the margin region 203. For example, the correction reference row determination unit 705 may select a reference row in such a manner that a difference between a maximum value of the size of the left side of the margin region and a maximum value of the size of the right side of the margin region is contained in a predetermined range.

Next, an effect of the selection of the reference row will be described with reference to FIG. 5B. As described above, FIG. 4C illustrates that the rolling shutter distortion generated by the motion information illustrated in FIG. 4A is corrected using the central row in the image cutout region 402 as the reference row. As illustrated in FIG. 2, if the image cutout region 202 is located at the center of the whole imaging region 201, using the central row in the image cutout region 402 as the reference row as illustrated in FIG. 4C can more reduce the required margin region than using the first row in the image cutout region 402 as the reference row as illustrated in FIG. 4B. However, even in this case, the margin region remains left-right asymmetric ($S_{ax} < S_{bx}$), and there is still room to save the region. On the other hand, as illustrated in FIG. 5B, the geometric deformation can be evenly distributed to the left and right sides of the margin region ($S'_{ax} = S'_{bx}$) by selecting an appropriate reference row. A relationship between the size of the margin region when the central row is selected as the reference row ($S_{bx}, S_{by}$), and the size of the margin region when an appropriate row is selected as the reference row ($S'_{bx}, S'_{by}$) is expressed by the following formula 13.

$$\max(S_{bx}, S_{by}) > \max(S'_{bx}, S'_{by}) \quad \text{FORMULA 13}$$

In this manner, the required margin region can be saved without changing the limitation on a size of a correctable rolling shutter distortion. However, in imaging of moving image data, changing the reference row for the rolling shutter distortion correction processing corresponds to changing a sampling timing in the temporal direction. Therefore, if the reference row for the rolling shutter distortion correction processing is excessively largely changed between adjacent frames, this results in occurrence of such a problem that an object appears as if it is moving unstably at an inconstant speed although the object is actually moving at a constant speed. Therefore, it is effective to impose a limitation on the reference row to be determined by the correction reference row determination unit 105 based on the reference row used in the rolling shutter distortion correction processing for an immediately preceding frame. For example, a possible method therefor is imposing a limitation on a range of the reference row, as expressed by the following formula 14.

$$y_{1\_n-1} - \Delta y \le y_{1\_n} < y_{1\_n-1} + \Delta y \quad \text{FORMULA 14}$$

In this formula, "$\Delta y$" represents a parameter that controls an allowable range of a range change. The reference row can be prevented from being largely changed between successive frames specific to moving image data, by imposing a limitation for selecting the reference row from rows within a predetermined range from the previously selected row (the immediately preceding frame in this example). As a result, it is possible to solve the problem with the sampling timing in the temporal direction, which occurs in the rolling shutter distortion correction processing.

Figure 6:
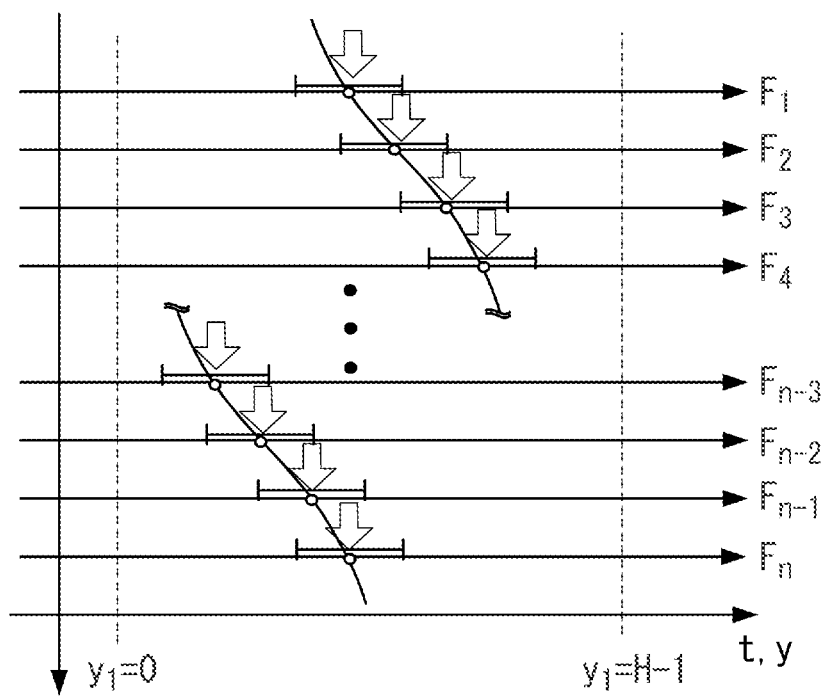
FIG. 6 illustrates sampling positions in respective frames in relation to a progression of the frames when the rolling shutter distortion correction processing is performed while the reference row is determined with a limitation imposed on a range.

FIG. 6 illustrates sampling positions in respective frames in relation to a progression of the frames when the reference row is determined with the limitation imposed on the range, and the rolling shutter distortion correction processing is performed based thereon. In FIG. 6, a vertical axis direction indicates the progression of the frames, and a horizontal axis direction indicates a sampling timing after the rolling shutter distortion correction processing during a frame period or a vertical position of the reference row in the image data. FIG. 6 illustrates that the imaging timing smoothly changes between the frames by imposing the limitation on the selection of the reference row. A formula of the limited selection of the reference row is expressed by the following formula 15. In this formula, $y_{1a} = y_1 - \Delta y$, $y_{1b} = y_1 - \Delta y$.

$$y_{1best} = \underset{y_{1a} \le y_1 \le y_{1b}}{\operatorname{argmin}} \left( f_{cost}(y_1, \vec{x}_{test}, \vec{p}) \right) \quad \text{FORMULA 15}$$

Further, the correction reference row determination unit 105 cannot start determining the reference row until all of motion information pieces at the time of imaging respective rows constituting a frame are acquired. This becomes a huge limitation, if real-time processing is desired in imaging of moving image data. On the other hand, a rolling shutter distortion has a similar tendency between adjacent frames due to the characteristic of moving image data. Therefore, to overcome this limitation, for a frame in which the reference row is determined from motion information during a period when respective rows are accumulated, this reference row information is not used. This reference row information is used for the rolling shutter distortion correction processing in the next frame. As a result, the correction reference row determination unit 105 can start correcting a distortion once motion information can be acquired as far as the reference row.

As described above, when a rolling shutter distortion is corrected based on motion information acquired from the rotation/shift sensor, even if the motion information contains a change so that the conventional method for correcting a rolling shutter cannot avoid increasing the margin region required for the correction, the present exemplary embodiment can efficiently correct the rolling shutter distortion while effectively utilizing a small margin region.

Next, a second exemplary embodiment of the present subject matter will be described. In the following description, the second exemplary embodiment will be described focusing on differences from the first exemplary embodiment. Therefore, the above-described features of the first exemplary embodiment can also apply to the second exemplary embodiment as appropriate.

Figure 7:
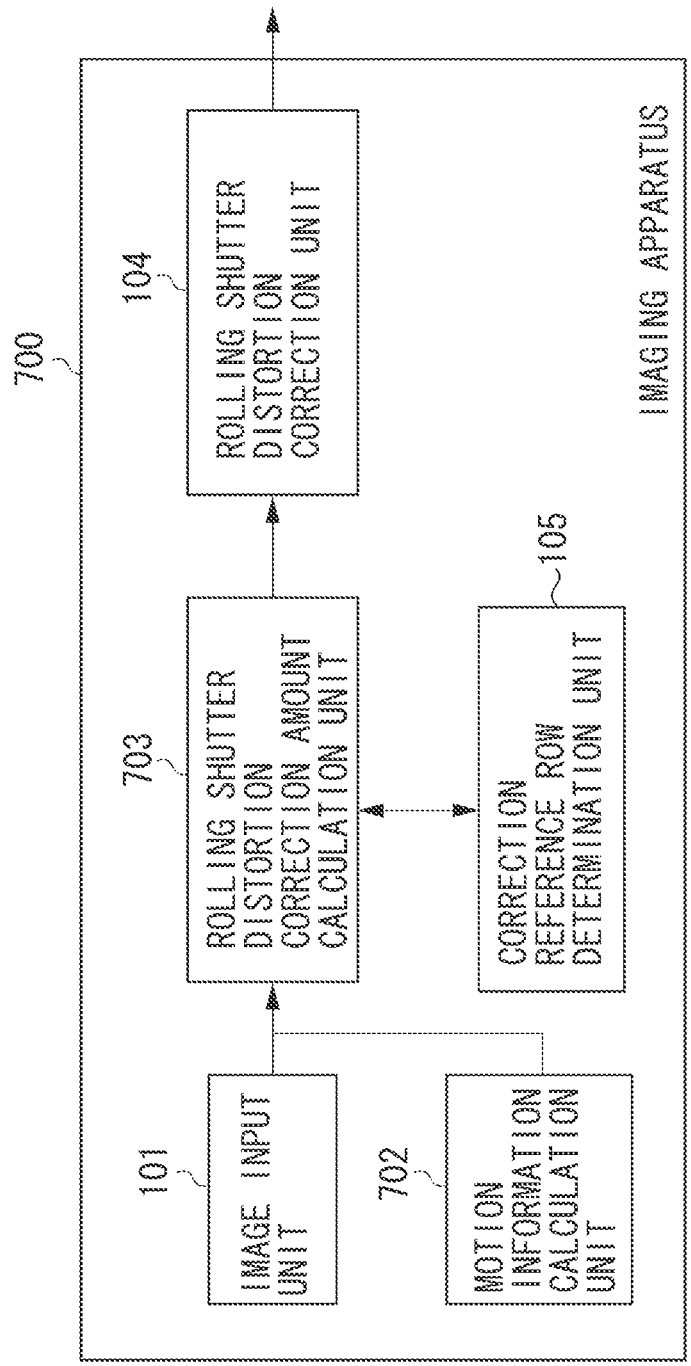
FIG. 7 illustrates a configuration of an imaging apparatus according to a second exemplary embodiment of the present subject matter.

FIG. 7 illustrates a configuration of an imaging apparatus 700 according to the present exemplary embodiment. As illustrated in FIG. 7, the imaging apparatus 700 according to the present exemplary embodiment includes an image input unit 101, a motion information calculation unit 702, a rolling shutter distortion correction amount calculation unit 703, a rolling shutter distortion correction unit 104, and a correction reference row determination unit 105. The image input unit 101, the rolling shutter distortion correction unit 104, and the correction reference row determination unit 105 illustrated in FIG. 7 are similarly configured to the image input unit 101, the rolling shutter distortion correction unit 104, and the correction reference row determination unit 105 illustrated in FIG. 1, respectively, and therefore the descriptions thereof are omitted herein.

The motion information calculation unit 702 inputs two or more frames from the image input unit 701 to calculate motion information. In other words, the motion information calculation unit 702 calculates relative motion information between the imaging apparatus 700 and an object from a motion vector between frames. The motion vector is acquired by repeating processing of cutting out a local region in one of the frames as a template, and calculating a correlation in the other of the frames.

Figure 8:
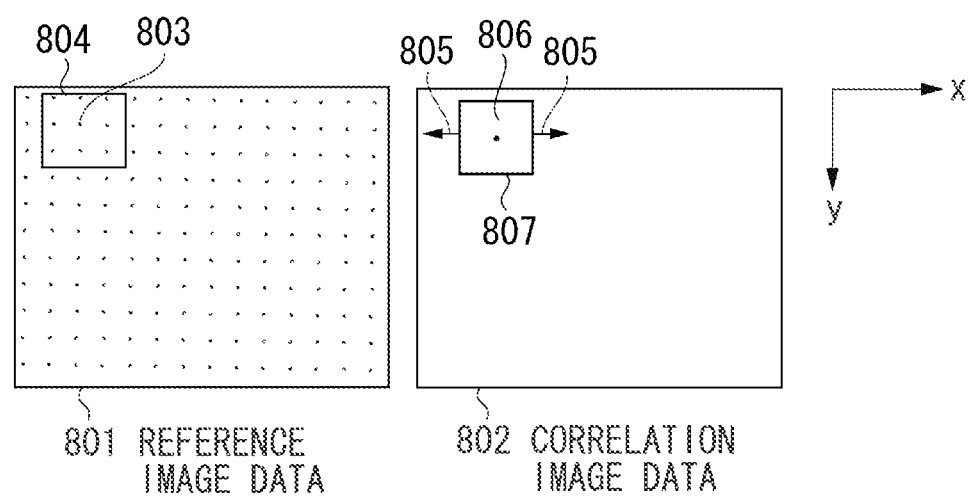
FIG. 8 illustrates template matching between two frames.

FIG. 8 illustrates template matching between two frames. In FIG. 8, the left frame is set as reference image data 801, and the right frame is set as correlation image data 802. For example, the left reference image data 801 corresponds to preceding image data immediately before a current frame, and the right correlation image data 802 corresponds to image data of the current frame subsequent thereto. Then, a position of a pixel arbitrarily selected in the reference image data 801 is set as a reference point 803 for which a motion vector is to be calculated by template matching. Then, a region around this position, i.e., a region 804 surrounded by a square in the reference image data 801 in FIG. 8 is set as a template thereof. Then, the motion information calculation unit 702 searches for a corresponding point in the correlation image data 802. A corresponding position search range 805 is arbitrarily set in the correlation image data 802. A possible maximum displacement amount between the input two frames is set as the corresponding position search range 805. It is desirable to limit this search range as much as possible to prevent the corresponding position search from finding out a false corresponding point.

The motion information calculation unit 702 calculates a correlation value of each of corresponding point candidates 806 in the corresponding point search range 805 to the reference point 803. The motion information calculation unit 702 calculates the correlation value by calculating a normalized cross-correlation between pixel values or a sum of differences of pixel values with respect to a region 807 having a same size as the region 804 as the template, which is set to the corresponding point candidate 806. The motion information calculation unit 702 calculates the correlation value for each of the corresponding point candidates 806 existing in the search range 805. Then, the motion information calculation unit 702 selects a corresponding point candidate 806 having a highest correlation as the corresponding point, and calculates a deviation between the reference point 803 and the corresponding point as a motion vector.

If one of corresponding pixels among surrounding pixels contained in the region 804 or the region 807 is an overexposed pixel or an underexposed pixel, this pixel is excluded from the correlation value calculation. Then, as a result of the correlation value calculation, the motion information calculation unit 702 outputs a plurality of motion vectors at an arbitrary coordinate position acquired between the two or more frames as the motion information. Further, the motion information calculation unit 702 may select a more aggregated global vector from the plurality of motion vectors to output it as the motion information. At this time, the motion information calculation unit 702 may remove a redundant motion vector by, for example, clustering.

Figure 9:
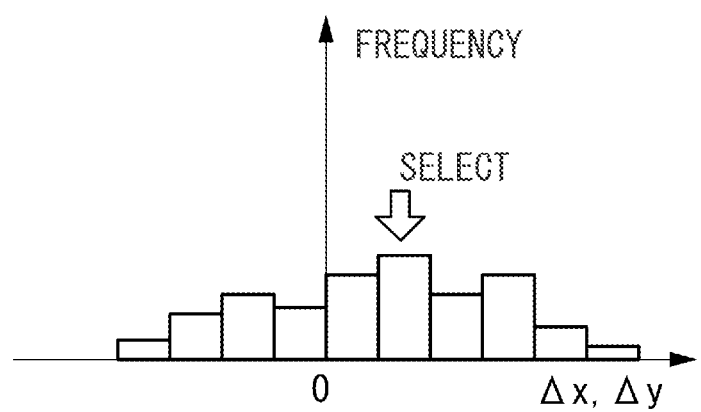
FIG. 9 illustrates an example of a method for selecting a global vector using a histogram.

FIG. 9 illustrates an example of a method for selecting the global vector using a histogram. The motion information calculation unit 702 forms a histogram, for example, for each of components in the vertical direction and the horizontal direction from the plurality of motion vectors acquired from the template matching. Then, the motion information calculation unit 702 selects a value corresponding to a highest frequency as indicated by an arrow in FIG. 9 as a component of the global vector. Alternatively, the motion information calculation unit 702 may form a two-dimensional histogram from the plurality of motion vectors, and select a motion vector of a bin corresponding to a highest frequency as the global vector.

Further, the motion information calculation unit 702 may calculate a motion parameter between the frames that corresponds to a degree of freedom of the spatial motion model function, instead of selecting the global vector from the plurality of motion vectors. The method for calculating a motion parameter between the frames that corresponds to a degree of freedom of the spatial motion model function instead of the global vector can be realized by, for example, a method discussed in Japanese Patent Application Laid-Open No. 2005-26941. For example, assuming such a simple case that the spatial motion model function handles only motions of a translation and scaling, the motion parameter between the frames is expressed by the following formula 16.

$$\begin{bmatrix} \vec{x}'_n \\ 1 \end{bmatrix} = \begin{bmatrix} a_n & 0 & c_n \\ 0 & a_n & d_n \\ 0 & 0 & 1 \end{bmatrix} \begin{bmatrix} \vec{x}'_{n-1} \\ 1 \end{bmatrix} \quad \text{FORMULA 16}$$

The symbol "$\vec{x}'_{n-1}$" represents coordinates in image data of an immediately preceding frame that contains a distortion. The symbol "$\vec{x}'_n$" represents coordinates in image data of a current frame that also contains a distortion.

The motion parameter is acquired from the plurality of motion vectors calculated between the frames by the method discussed in Japanese Patent Application Laid-Open No. 2005-26941. The method discussed in Japanese Patent Application Laid-Open No. 2005-26941 is a method that allows the motion parameter to be acquired by a procedure substantially similar to a global vector calculation method, i.e. simple four arithmetic operations and histogram processing.

Further, the motion parameter may be calculated by performing least square fitting on the plurality of motion vectors acquired in the image data. A formula for calculating the motion parameter of the Helmert model that contains motions of a translation and scaling from the motion vectors is expressed by the following formula 17.

$$\begin{bmatrix} x'_1 \\ y'_1 \\ x'_2 \\ y'_2 \\ \vdots \\ x'_m \\ y'_m \end{bmatrix} = \begin{bmatrix} x_1 & y_1 & 1 & 0 & 0 & 0 \\ 0 & 0 & 0 & x_1 & y_1 & 1 \\ x_2 & y_2 & 1 & 0 & 0 & 0 \\ 0 & 0 & 0 & x_2 & y_2 & 1 \\ \vdots & & & & & \\ x_m & y_m & 1 & 0 & 0 & 0 \\ 0 & 0 & 0 & x_m & y_m & 1 \end{bmatrix} A'_n \quad \text{FORMULA 17}$$

in which $A'_n = [a_1, a_2, a_3, a_4, a_5, a_6]$, $$A_n = \begin{bmatrix} a_1 & a_2 & a_3 \\ a_4 & a_5 & a_6 \\ 0 & 0 & 1 \end{bmatrix}$$

In this formula, the symbol "$\vec{u}(\vec{x})$" represents a motion at each coordinate between the frames.

Then, m sets of motion vectors $(\Delta x_i, \Delta y_i)(i=1, \ldots, m)$, calculated coordinates $(x_i, y_i)$ in this image data, and corresponding coordinates $(x_i', y_i')$ in a next frame acquired from this information are substituted into both sides of the first formula of the formula 17. It should be noted here that the points are represented by different expressions from the formula 16. Then, the motion parameter between the frames, which is a coefficient of the formula, is acquired by solving a homogeneous formula in which actual data is introduced into coefficients by the least square method. The thus-acquired motion parameter of the spatial motion model function may be an output of the motion information calculation unit 702. Further, the motion information calculation unit 702 may partially select the motion parameter as a motion limited to a translation and scaling according to the spatial motion model function.

The rolling shutter distortion correction amount calculation unit 703 calculates a rolling shutter distortion correction amount based on the motion information input from the motion information calculation unit 702. If the input motion information is only motion information between frames, the rolling shutter distortion correction amount calculation unit 703 calculates a rolling shutter distortion correction amount, assuming that a motion corresponding to each row in the image data during this time changes at a constant speed. In other words, the rolling shutter distortion correction amount calculation unit 703 assumes that speed information of a motion calculated for each row is constant.

Then, the rolling shutter distortion correction amount calculation unit 703 calculates a rolling shutter distortion correction amount with use of the motion parameter between the frames as the motion information according to the next formula 4". The formula 4" can be simplified into the following formula by assuming that a motion is an invariable constant term and introducing a motion at each coordinate between the frames into the integral term.

$$\vec{x}' = \vec{x} + \vec{u}(\vec{x})\frac{y' - y_1}{H} \quad \text{FORMULA 4''}$$

Further, the motion vector at each coordinate between the frames can be expressed by the following formula 18, assuming that a motion is limited to, for example, a translation and scaling according to the spatial motion model function.

$$\vec{u}(\vec{x}) = \begin{bmatrix} a_n - 1 & 0 & c_n \\ 0 & a_n - 1 & d_n \\ 0 & 0 & 1 \end{bmatrix} \vec{x} - \vec{x} = \quad \text{FORMULA 18}$$

$$\begin{bmatrix} a_n - 1 & 0 & c_n \\ 0 & a_n - 1 & d_n \\ 0 & 0 & 1 \end{bmatrix}$$

Further, by substituting the formula 4" into the formula 17, the mapping formula from coordinates in the image data after the rolling shutter distortion correction processing to coordinates in the image data before the rolling shutter distortion correction processing, which is required to calculate a rolling shutter distortion correction amount, can be acquired in the form of the following formula 19 using a homography h. In this formula, the index n of each coefficient is omitted.

$$h = \begin{bmatrix} \frac{1}{H} & \frac{cH}{H((H-d)(H-(a-1)y_1) - d(a-1)y_1)} & \frac{cy_1(H-d-1)}{H((H-d)(H-(a-1)y_1) - d(a-1)y_1)} \\ 0 & \frac{H-(a-1)y_1}{(H-d)(H-(a-1)y_1) - d(a-1)y_1} & -\frac{dy_1}{(H-d)(H-(a-1)y_1) - d(a-1)y_1} \\ 0 & -\frac{a-1}{(H-d)(H-(a-1)y_1) - d(a-1)y_1} & \frac{H-dy_1}{(H-d)(H-(a-1)y_1) - d(a-1)y_1} \end{bmatrix} \quad \text{FORMULA 19}$$

In this formula, $\vec{x}' = h\vec{x}$.

Contrary to this formula, a homography expression $h^{-1}$ of a mapping formula from coordinates in the image data before the rolling shutter distortion correction processing to coordinates in the image data after the rolling shutter distortion correction processing is expressed by the following formula 20 by inverting the matrix.

$$h^{-1} = \begin{bmatrix} H & -c & cy_1 \\ 0 & H - dy_1 & dy_1 \\ 0 & (a-1) & H - (a-1)y_1 \end{bmatrix} \quad \text{FORMULA 20}$$

In this formula, $\vec{x} = h^{-1}\vec{x}'$.

Figure 10A:
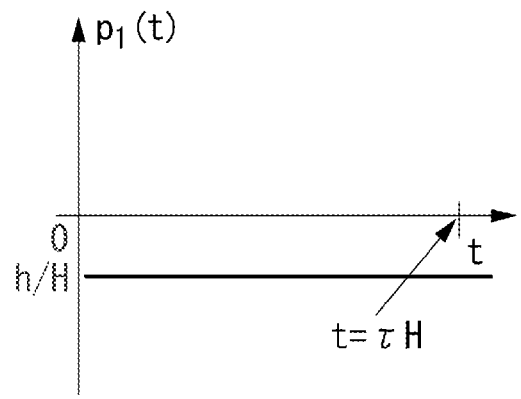
FIG. 10A illustrates motion information acquired from a yaw-direction rotation sensor, which is a motion information calculation unit 702.

FIGS. 10A to 10F illustrate examples of how the rolling shutter distortion correction processing is performed after a rolling shutter distortion correction amount is calculated according to the formula 19 when the motion information between the frames is input. FIG. 10A illustrates motion information acquired from the yaw-direction rotation sensor, which is the motion information calculation unit 702. In FIG. 10A, a rotation in the pitch direction is omitted, assuming that this motion does not occur. Further, the case is simplified assuming that the focal length is fixed. The example illustrated in FIG. 10A indicates a case in which only a translation in the yaw direction is detected.

Figure 10B:
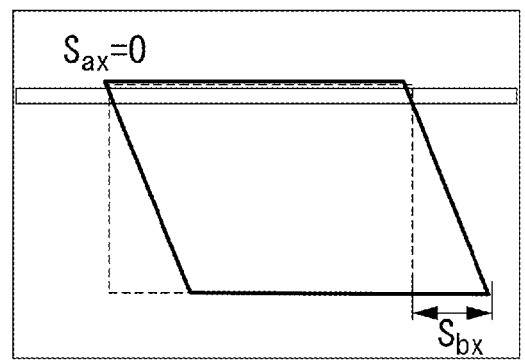
FIG. 10B illustrates the rolling shutter distortion correction processing when the first row is used as the reference row.
Figure 10C:
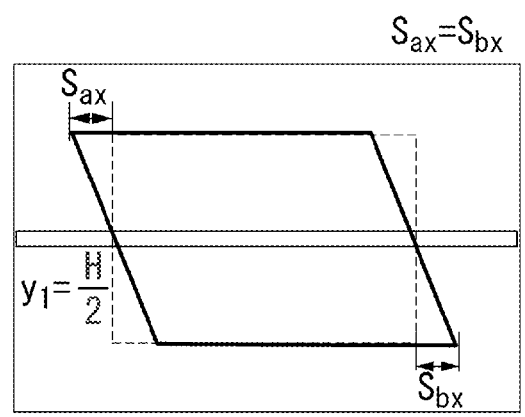
FIG. 10C illustrates the rolling shutter distortion correction processing when the central row in the readout direction is used as the reference row.

In FIG. 10A, a parameter indicated as a value corresponding to a constant value on the vertical axis is a value h/H, which is acquired by dividing the homography variable h by the number of rows H. FIG. 10B illustrates how the rolling shutter distortion correction processing is performed when the first row is used as the reference row. Further, FIG. 10C illustrates how the rolling shutter distortion correction processing is performed when the central row in the readout direction is used as the reference row. In the rolling shutter distortion correction processing illustrated in FIG. 10B, the margin region is unevenly set in which only one side ($S_{bx}$) of the margin region is used in sampling in a similar manner to the example illustrated in FIG. 4B.

On the other hand, as illustrated in FIG. 10C, when the central row in the readout direction is used as the reference row, the range where pixels are sampled is distributed to the left and right sides of the margin region. Especially, when the input is limited to motion information between frames, a motion in each row is considered to always have a constant speed, which leads to constantly left-right symmetric and even use of the margin region ($S_{ax} = S_{bx}$). When a motion is limited to a translation, the rolling shutter distortion correction processing can be performed using the margin region without wasting any of the margin.

Figure 10D:
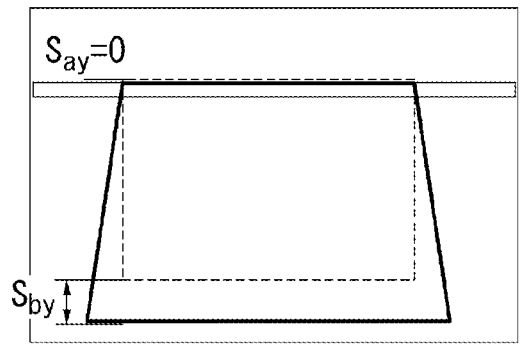
FIG. 10D illustrates the rolling shutter distortion correction processing when the first row is used as the reference row.
Figure 10E:
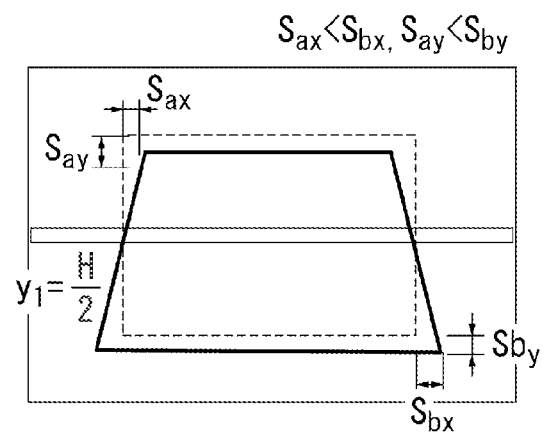
FIG. 10E illustrates the rolling shutter distortion correction processing when the central row in the readout direction is used as the reference row.
Figure 10F:
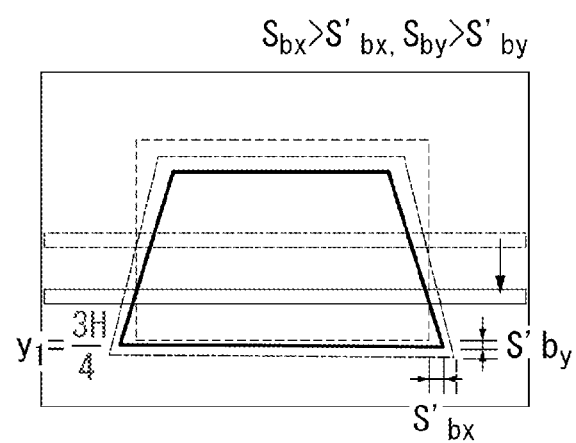
FIG. 10F illustrates the rolling shutter distortion correction processing when a row further lower than the central row illustrated in FIG. 10E by a size of one-fourth of an image height is used as the reference row.

Next, FIGS. 10D and 10E illustrate how the rolling shutter distortion correction processing is performed when the motion between the frames is only scaling. While FIGS. 10B and 10C illustrate how the rolling shutter distortion correction processing is performed when the motion information illustrated in FIG. 10A is considered as a change amount of a translation in the image data, FIGS. 10D and 10E illustrate how the rolling shutter distortion correction processing is performed when the motion information illustrated in FIG. 10A is considered as a change among of scaling in the image data. FIG. 10D illustrates how the rolling shutter distortion correction processing is performed when the first row is used as the reference row, and FIG. 10E illustrates how the rolling shutter distortion correction processing is performed when the central row in the readout direction is used as the reference row. As understood from the results illustrated in FIGS. 10D and 10E, a motion between frames that contains only a scaling component requires not only a margin region in the horizontal direction but also a margin region in the vertical direction. As illustrated in FIG. 10E, the margin region includes upper left sizes $S_{ax}$ and $S_{ay}$, and lower right sizes $S_{bx}$ and $S_{by}$. In this manner, according to a relationship between the characteristic of a change in scaling in the image data and the formula 4, the required margin region cannot be symmetric unlike the example of a translation no matter how the reference row is set. However, FIG. 10E reveals that changing the reference row displaces the outermost sampling position relative to the image cutout region, thereby allowing a reduction in the required margin region even in this case. FIG. 10F illustrates how the rolling shutter distortion correction processing is performed when a row further lower than the central row illustrated in FIG. 10E by a size of one-fourth of the image height is used as the reference row. Because the reference row is located closer to the lower end of the image data, a rolling shutter distortion correction amount reduces for this row and rows below it. Therefore, this setting can reduce the margin region required to generate the output image data. Accordingly, even a larger distortion can be corrected.

In other words, introducing the technique for changing the reference row for the rolling shutter distortion correction processing according to the present exemplary embodiment is also effective even for the rolling shutter distortion correction processing when the motion information is acquired as a motion vector between frames, when the motion information contains scaling, which is a motion of a most common type as a change in image data.

Further, obviously, the spatial motion model function that uses the motion vector or the global vector in the image data as an input, which is employed in the present exemplary embodiment, can be also replaced with an arbitrary function, in a similar manner to the spatial motion model function that uses the sensor signal as an input, which is employed in the first exemplary embodiment. For example, this function can be replaced with a further advanced model that can handle even a motion of an in-plane rotation around a normal line vertical to the image data as an axis.

Next, a third exemplary embodiment of the present subject matter will be described. In the following description, the third exemplary embodiment will be described focusing on differences from the first and second exemplary embodiments. Therefore, the above-described features of the first and second exemplary embodiments can also apply to the third exemplary embodiment as appropriate.

Figure 11:
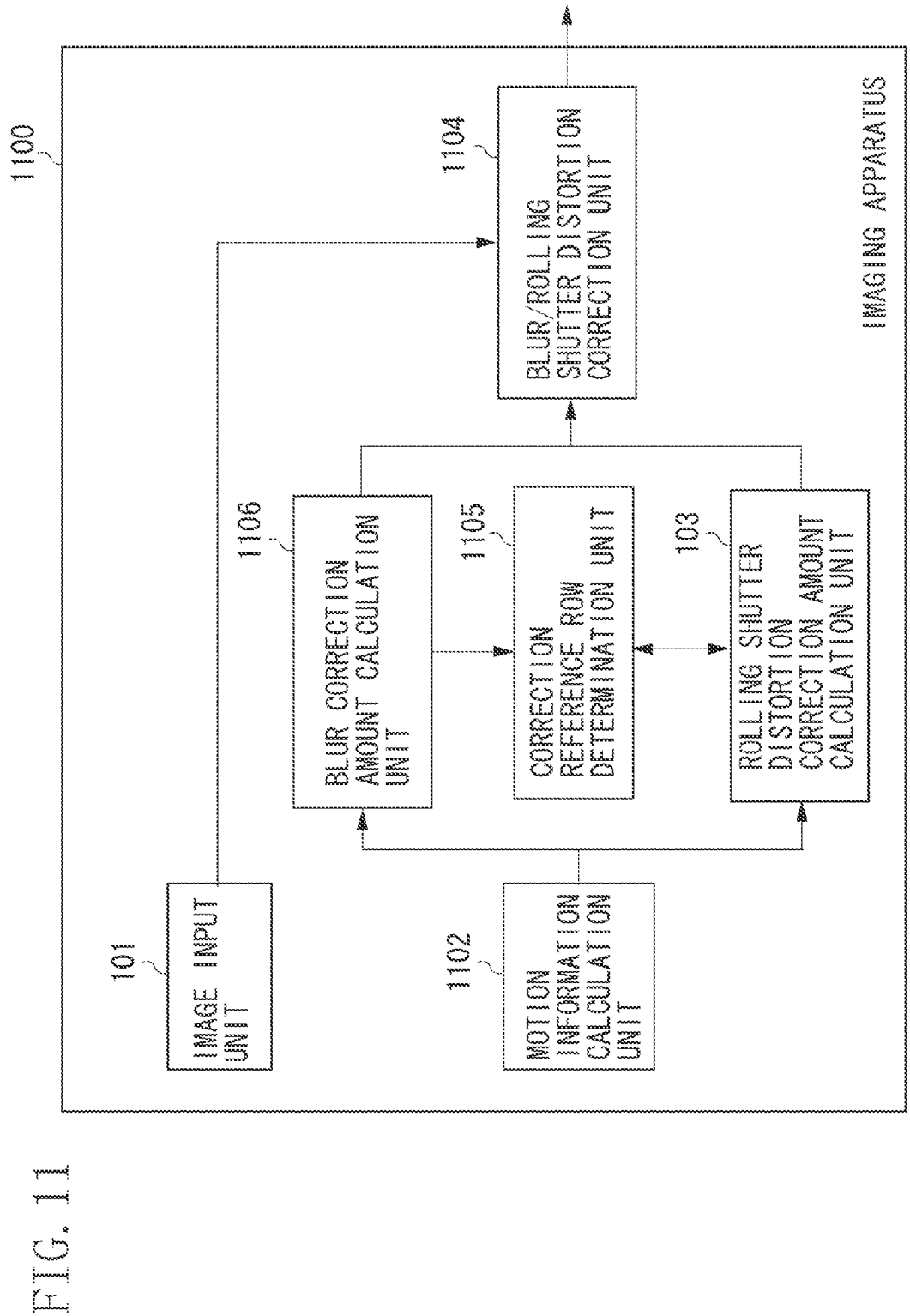
FIG. 11 is a block diagram illustrating a configuration of an imaging apparatus according to a third exemplary embodiment of the present subject matter.

FIG. 11 is a block diagram illustrating a configuration of an imaging apparatus 1100 according to the third exemplary embodiment. The imaging apparatus 1100 according to the present exemplary embodiment can correct a deterioration of image data due to a camera shake in addition to a rolling shutter distortion.

As illustrated in FIG. 11, the imaging apparatus 1100 according to the present exemplary embodiment includes an image input unit 101, a motion information calculation unit 1102, a rolling shutter distortion correction amount calculation unit 103, a blur/rolling shutter distortion correction unit 1104, a correction reference row determination unit 1105, and a blur correction amount calculation unit 1106. The image input unit 101 and the rolling shutter distortion correction amount calculation unit 103 illustrated in FIG. 11 are similarly configured to the image input unit 101 and the rolling shutter distortion correction amount calculation unit 103 illustrated in FIG. 1, respectively, and therefore the descriptions thereof are omitted herein.

Figure 12A:
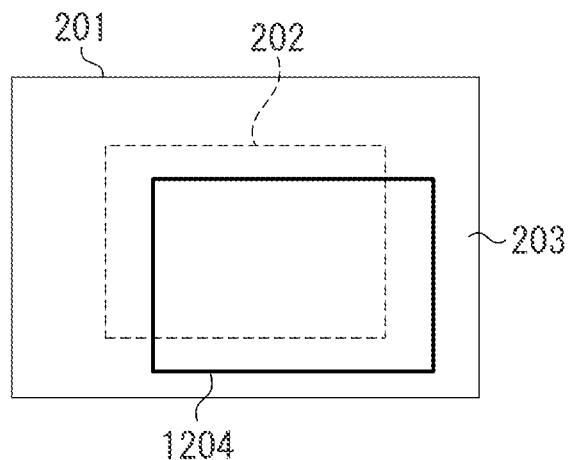
FIG. 12A illustrates correction processing using a geometric deformation when only image blur correction processing is performed on image data.

The blur correction amount calculation unit 1106 determines a correction amount for reducing a blur (a vibration) in image data based on motion information acquired from the motion information calculation unit 1102. For example, one conceivable method as a simple motion model is providing the imaging apparatus 1100 with the biaxial rotation sensor employed in the first exemplary embodiment, and using a linear approximation model near the optical axis for a rotation as the spatial motion model function. Further, a most simple method for determining a correction amount is eliminating an effect of a vibration due to a motion based on a first frame. In this case, the image blur can be eliminated by selecting a geometric deformation amount that can cancel out an integral value of motion information from the time of imaging the first frame as a blur correction amount. As a result, as illustrated in FIG. 12A, the image cutout region 202 is shifted by a distance corresponding to the blur correction amount, thereby realizing elimination of the vibration in the image data. A rectangular region 1204 indicated by a solid line is the image cutout region after the vibration is eliminated.

The present exemplary embodiment employs such a simple blur correction amount calculation unit 116, but may employ a unit that makes a further advanced blur correction using more motion sensors, instead of it. The blur/rolling shutter distortion correction unit 1104 corrects a blur in addition to a rolling shutter distortion by the geometric deformation. In other words, the blur/rolling shutter distortion correction unit 1104 receives inputs of image data and the parameter or the nomography of the mapping formula for the geometric deformation for each correction, and generates image data in which a blur and a rolling shutter distortion are corrected by the geometric deformation. Simple alternative processing to the geometric deformation includes changing a position where the image data is read out from a buffer temporarily storing the image data including the margin region, and changing a position where the image data is read out from the image sensor, as derivatives therefrom.

Further, an optical image blur correction unit, which eliminates a blur in image data by shifting a lens in an optical system included in the image input unit 101, may be used together with the above-described configuration to eliminate a blur corresponding to a correction of a component having a high frequency and an extremely small amplitude of a translation component of the geometric deformation. The optical image blur correction unit includes the optical system included in the motion information calculation unit 1102 and the image input unit 101, and a feedback mechanism including a not-illustrated lens shift driving system. In this case, the blur correction mechanism according to the present exemplary embodiment plays a role in eliminating a blur component having a low frequency and a large amplitude that cannot be eliminated by this optical image blur correction unit. Further, the optical image blur correction unit can also eliminate a rolling shutter distortion, and the blur/rolling shutter distortion correction unit 1104 plays a role in correcting a rolling shutter distortion that is still generated. Image data output from the blur/rolling shutter distortion correction unit 1104 is recorded in a recording medium or the like by a not-illustrated recording unit, or is displayed on a display unit that is neither illustrated in FIG. 11.

Figure 12B:
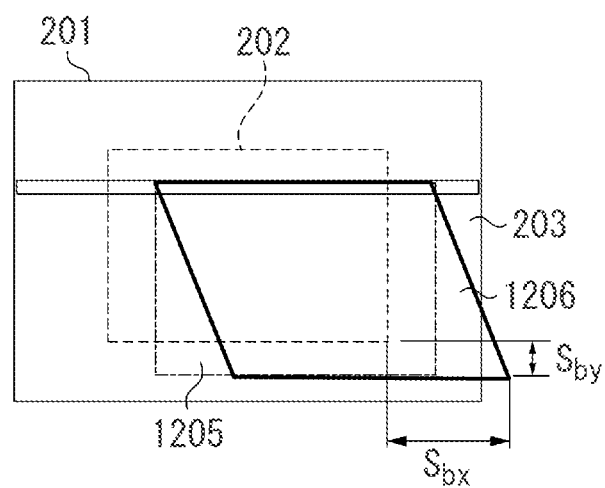
FIG. 12B illustrates the correction processing using the geometric deformation when only the image blur correction processing is performed on the image data, and processing for correcting both a blur and a rolling shutter distortion.

While FIG. 12A illustrates how the correction processing is performed by the geometric deformation when only a blur is eliminated, FIG. 12B illustrates how the processing for correcting both a blur and a rolling shutter distortion is performed. FIG. 12B illustrates how the correction processing is performed when the first row is used as the reference row for the rolling shutter distortion correction. A region 1206 can be acquired as final positions where pixel values are sampled by setting pixels in an image cutout region 1204 after the elimination of the vibration illustrated in FIG. 12A as sampling sources, and performing the geometric deformation according to the rolling shutter distortion correction amount calculated by the rolling shutter distortion correction amount calculation unit 103. A region 1205 illustrated in FIG. 12B corresponds to positions where pixel values are sampled after the blur correction. Further, the lower right side of the margin region illustrated in FIG. 12B has sizes $S_{bx}$ and $S_{by}$. In the example illustrated in FIG. 12B, the region 1206 for acquiring output image data protrudes beyond a whole imaging region 201, but the margin region should be prepared so as to contain the whole region 1206 to acquire the whole output image data.

Figure 13:
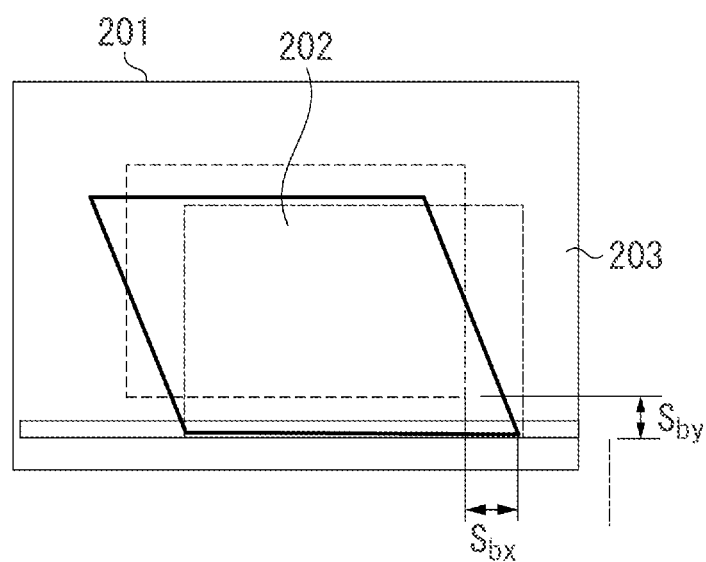
FIG. 13 illustrates an example of processing for selecting the reference row.

The correction reference row determination unit 1105 determines the correction reference row, based on which the rolling shutter distortion correction is performed. More specifically, the correction reference row determination unit 1105 selects a reference row that can minimize the margin region required for the correction while taking into consideration the rolling shutter distortion correction amount and the blur correction amount at the same time. In the following description, an example of processing for selecting the reference row will be described with reference to FIG. 13. In this example, as illustrated in FIG. 13, the last row is selected as the reference row that can minimize the margin region. In this manner, the present exemplary embodiment determines the reference row for the rolling shutter distortion correction processing so as to reduce the margin region required for the whole blur correction processing and rolling shutter distortion correction processing in consideration of both the blur correction amount and the rolling shutter distortion correction amount. As a result, the present exemplary embodiment can save the margin region required for the rolling shutter distortion correction processing, and correct even a larger blur and a larger rolling shutter distortion.

The present subject matter can be employed for not only the imaging apparatus but also, for example, a portable information terminal to which an imaging apparatus is included, an image processing apparatus that processes captured image data as post-processing, and an image display apparatus including such an image processing apparatus.

Further, the present subject matter can be employed for not only the imaging apparatus that a user uses to capture an image while holding it with a hand, but also a fixedly installed imaging apparatus like a security camera to mainly image a moving object such as a passerby and a car.

Further, the present subject matter can be also realized by performing the following processing. This processing is supplying software (a program) that realizes the functions of the above-described exemplary embodiments to a system or an apparatus via a network or any of various kinds of nonvolatile storage media, and causing a computer (or a central processing unit (CPU), a micro processing unit (MPU), or the like) of the system or the apparatus to read out the program to execute it.

Other Embodiments

Embodiments of the present subject matter can also be realized by a computer of a system or apparatus that reads out and executes computer executable instructions recorded on a storage medium (e.g., non-transitory computer-readable storage medium) to perform the functions of one or more of the above-described embodiment(s) of the present subject matter, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present subject matter has been described with reference to exemplary embodiments, it is to be understood that the subject matter is not limited to the disclosed exemplary embodiments. The scope of the following claims is to be accorded the broadest interpretation so as to encompass all such modifications and equivalent structures and functions.

This application claims the benefit of Japanese Patent Application No. 2013-018680 filed Feb. 1, 2013, which is hereby incorporated by reference herein in its entirety.

What is claimed is:

1. An imaging apparatus comprising:
    an imaging unit employing a rolling shutter method; and
    a correction unit configured to perform correction processing for reducing a rolling shutter distortion on image data captured by the imaging unit, the correction processing being performed by adjusting readout positions of other lines relative to a readout position of a reference line in the image data,
    wherein the correction unit sets the reference line so as to reduce a deviation amount between the readout position of the reference line and the readout positions of the other lines when performing the correction processing.

2. The imaging apparatus according to claim 1, further comprising a detection unit configured to detect a motion of the imaging apparatus,
    wherein the correction unit adjusts the readout positions of the other lines based on the motion of the imaging apparatus, which is detected by the detection unit.

3. The imaging apparatus according to claim 1, wherein the correction unit determines the reference line so as to minimize a margin region added to a size of output image data for the correction processing.

4. The imaging apparatus according to claim 1, wherein the correction unit determines the reference line in such a manner that, among the other lines, a difference between a maximum value of the deviation amount in a first direction and a maximum value of the deviation amount in a second direction opposite to the first direction is contained in a predetermined range.

5. The imaging apparatus according to claim 1, wherein the correction unit newly sets the reference line from lines within a predetermined range from a previously determined reference line.

6. The imaging apparatus according to claim 1, wherein the correction unit calculates a correction amount for adjusting the readout positions of the other lines relative to the readout position of the reference line from first image data, and adjusts the readout positions of the other lines relative to the readout position of the reference line in second image data acquired after the first image data based on the correction amount calculated from the first image data.

7. The imaging apparatus according to claim 2, wherein the detection unit detects the motion of the imaging apparatus based on a camerawork of the imaging apparatus or a motion vector between frames in the image data.

8. The imaging apparatus according to claim 2, further comprising a blur correction amount calculation unit configured to calculate a blur correction amount for eliminating a blur in the image data captured by the imaging unit based on the motion of the imaging apparatus, which is detected by the detection unit, wherein the correction unit performs blur correction processing on the image data captured by the imaging unit based on the blur correction amount calculated by the blur correction amount calculation unit.

9. A method for controlling an imaging apparatus including an imaging unit employing a rolling shutter method, the method comprising:

performing a correction for reducing a rolling shutter distortion on image data captured by the imaging unit, wherein the correction includes adjusting readout positions of other lines relative to a readout position of a reference line in the image data, and wherein the correction further includes setting the reference line so as to reduce a deviation amount between the readout position of the reference line and the readout positions of the other lines.

10. A non-transitory storage medium storing a program for causing a computer to perform a method for controlling an imaging apparatus including an imaging unit employing a rolling shutter method, the method comprising:

performing a correction for reducing a rolling shutter distortion on image data captured by the imaging unit, wherein the correction includes adjusting readout positions of other lines relative to a readout position of a reference line in the image data, and wherein the correction further includes setting the reference line so as to reduce a deviation amount between the readout position of the reference line and the readout positions of the other lines.

* * * * *